July 28, 1970    R. H. HERRON    3,522,065
MAGNESIA CHROME ORE BASIC REFRACTORY SHAPE AND
A METHOD FOR MANUFACTURING SAME
Filed Oct. 22, 1968    2 Sheets-Sheet 1

INVENTOR
Robert H. Herron

PROPERTY VARIATION WITH SILICA CONTENT
FIRING TEMPERATURES OF 2800°F — — ×— —,
3000°F — —○— —, 3200°F —●—.

PROPERTY VARIATION WITH SILICA CONTENT
FIRING TEMPERATURES OF 2800°F — — ×— —,
3000°F — —○— —, 3200°F —●—.

PROPERTY VARIATION WITH SILICA CONTENT
FIRING TEMPERATURES OF 2800°F — — ×— —,
3000°F — —○— —, 3200°F —●—.

United States Patent Office 3,522,065
Patented July 28, 1970

3,522,065
MAGNESIA CHROME ORE BASIC REFRACTORY SHAPE AND A METHOD FOR MANUFACTURING SAME
Robert H. Herron, Bethlehem, Pa., assignor to Bethlehem Steel Corporation, a corporation of Delaware
Continuation-in-part of application Ser. No. 561,609, June 29, 1966. This application Oct. 22, 1968, Ser. No. 778,911
Int. Cl. C04b 35/42
U.S. Cl. 106—59   6 Claims

ABSTRACT OF THE DISCLOSURE

An improved fired basic refractory shape of the magnesia-chrome ore type made from a base refractory mix containing about 50% to about 80% magnesia, about 20% to about 50% chrome ore, and about 2% to 5% silica, having a microstructure of magnesia, recrystallized spinel, islands of silicates uniformly distributed throughout the shape and uniformly distributed closed pores. The fired refractory shape has an apparent porosity of 10%, good resistance to spalling and good strength at elevated temperatures. A method of manufacturing the shape is also described.

CROSS-REFERENCES TO RELATED APPLICATIONS

This appilcation is a continuation-in-part of my application Ser. No. 561,609, entitled "Fine-Grained Basic Refractory Mix and Method of Producing a Basic Refractory Shape Therefrom" filed June 29, 1966, now abandoned.

BACKGROUND OF THE INVENTION

Present day basic refractory shapes of the magnesia-chrome ore must have good strength at room temperature, must have good resistance to thermal shock and good strength at high temperatures. It is also necessary that these refractory shapes resist penetration by slag elements and gases present in the environment of meallurgical furnaces.

Prior art practices to increase the resistance of the shapes to penetration by slag elements and gases have included molding the refractory mix into denser structures by employing gap-sizing techniques or by fusion-casting the refractory material or by using finely-ground materials, for example —200 mesh grain size. Refractory shapes made by the gap-sizing technique may be dense but the coarse grains used in their manufacture prevent complete reaction of their constituents during the firing operation. As a result these refractory shapes have comparatively low strength when at high temperatures. Fused cast refractory materials on the other hand have a dense structure and good strength when at high temperatures but have poor resistance to thermal shock. Refractory shapes made from finely ground material have heretofore been dense but extremely brittle and have very poor resistance to thermal shock.

Porous structures, on the other hand, maintain structural integrity under thermal shock, but are susceptible to increased rate of penetration by slag elements and gases in the environment of the furnaces. Also, the structural inhomogeneity inherent in the coarse-textured porous shapes creates excessive variations in physical properties of the shapes thereby preventing application of normal structural design principles. Chemical inhomogeneity due to lack of contact between various phases in the multiphase system creates undesirable alteration of the structure in extended service at high temperatures.

It is therefore the primary object of this invention to provide a basic refractory shape made from a finely ground basic refractory mix, said shape having excellent room temperature strength, resistance to thermal shock, resistance to load at elevated temperatures and sufficient density to resist penetration by slag elements and gases present in the environment of a metallurgical furnace.

SUMMARY OF THE INVENTION

Broadly the invention is directed to a direct bonded fired basic refractory shape of the magnesia-chrome ore type haviing a microstructure of magnesia, recrystallized spinel, islands of silicates uniformly distributed throughout the shape and uniformly distributed closed pores made from a finely-ground basic refractory mix containing magnesia and chrome ore particles of substantially uniform size. The basic refractory mix is pressed into any desired shape and fired at a desired elevated temperature to produce a desired final product.

DESCRIPTION OF THE PREFERRED EMBODIMENTS

Figure 1:
FIG. 1 is a photomicrograph of the microstructure at 180 magnifications of a basic refractory shape prepared commercially by the gap-sizing technique, after reheating for 24 hours at 3000° F. and water-quenching.

I have found that a fired basic refractory shape containing from about 50% to about 80% magnesia and from about 20% to about 50% chrome ore and from about 2% to about 5% silica having good high temperature strength for resistance to structural loads, minimum open porosity for minimum penetration of slag into the shape structure and a large volume of closed porosity for resistance to crack propagation and thermal shock may be made from fine-grained material.

The basic refractory mix from which the fired basic refractory shape is produced may be made by blending high purity magnesia particles or magnesite aggregate containing not less than 90% magnesia with chrome ore aggregate, for example. Transvaal chrome ore or Philippine chrome ore, in the proper proportions. Typical examples of chrome ores useful in the invention are shown below:

| | Transvaal ore | Philippine ore |
|---|---|---|
| $Cr_2O_3$ | 48.0 | 32.0 |
| $Fe_2O_3$ | 25.0 | 14.0 |
| $Al_2O_3$ | 14.0 | 30.0 |
| $CaO$ | 0.2 | .4 |
| $SiO_2$ | 2.5 | 5.0 |
| $MgO$ | 10.0 | 18.0 |

NOTE: Remainder—Incidental impurities.

As is well known, chromium oxide and lime will react at firing temperatures to form a low melting constituent, calcium chromate. Therefore, the lime to silica ratio in the mix should be about .3 to about .5. The silica content of the chrome ore aggregate segregates in the finer particle sizes of the chrome ore when dry grinding is used. Therefore I prefer to use a wet grinding method in which a vehicle, for example, acetone and a binder, for example 60% polyvinyl acetate in methanol, are added to the magnesia-chrome ore mix. The basic refractory mix having the desired silica content may be made by adding a low silica chrome ore to the magnesia particles and adding thereto a precalcined lime-silica mixture in amounts sufficient to obtain a silica content in the basic refractory mix of about 2% to about 5%. Of course, it is also possible to dry grind a chrome ore with high silica content and blend a portion, for example, 60%, of the particles of +150 mesh Tyler Sieve Size which are low in silica, for example about 3.00%, with a portion, for example, 40% of the particles of −150 mesh Tyler Sieve Size which are high, for example, about 9.0% in silica to obtain a chrome ore of the desired silica content, for example 5.68%. The chrome ore and magnesia are added to each other in the desired proportions and are wet ground to the final desired particle size, that is, all the particles of the mix will pass a 150 mesh Tyler Sieve Size and not less than 90% of the particles of the mix will pass a 325 mesh Tyler Sieve Size.

I prefer to maintain the silica content between 2.5% and 3%. If the silica content is less than 2.5% the fired basic refractory shape will have a high volume of open porosity, for example 15%. This open porosity is too high to prevent penetration of slag into the interior of the shape resulting in early failure of the shape. Above 3%, hot transverse strength decreases and high firing temperatures, for example 3200° F., are required to obtain the desired amount of closed porosity in fired shape. Between 2½% and 3% silica, the hot transverse strength of the fired basic refractory shape is optimum and the desired closed porosity of at least about 5% is obtained with firing temperatures of about 2800° F. to about 3000° F.

The finely ground basic refractory mix is formed into a desired shape on a conventional brick press at pressures of from 5,000 p.s.i. up to about 26,500 p.s.i. The higher pressures may cause cracking in the formed shape; therefore, I prefer to use the lower pressures of about 5,000 p.s.i. to about 10,000 p.s.i.

Fine grinding the basic refractory magnesia and chrome ore grains in the refractory mix increases the surface area of the grains. Increasing the surface area increases the contact areas between the grains in the mix thereby increasing the rate of diffusion and solution of the chrome ore constituents in the magnesia and in the liquid silicate phase which is formed at high temperatures used to fire these shapes. Firing the pressed refractory shapes at temperatures as low as 2800° F. has resulted in substantially all the chrome ore going into solution in the magnesia grains or the liquid silicate phase. Since a portion of the spinel formers, chromium, iron and aluminum, are in solution in the magnesia grains, intergranular spinel bonding is enhanced resulting in increased strength at high operating temperatures. It is also suggested that the solution of the chrome ore in the liquid silicate phase tends to decrease the ability of the liquid silicate to wet the magnesia grains thereby causing small pools of silicate to form rather than a liquid silicate halo surrounding the magnesia grains. The solution of the chrome ore also creates equilibrium conditions thereby making a more volume stable shape less likely to spall because of dimensional changes caused by chemical changes which occur at high operating temperatures, for example 2700° F. to 3000° F.

Figure 2:
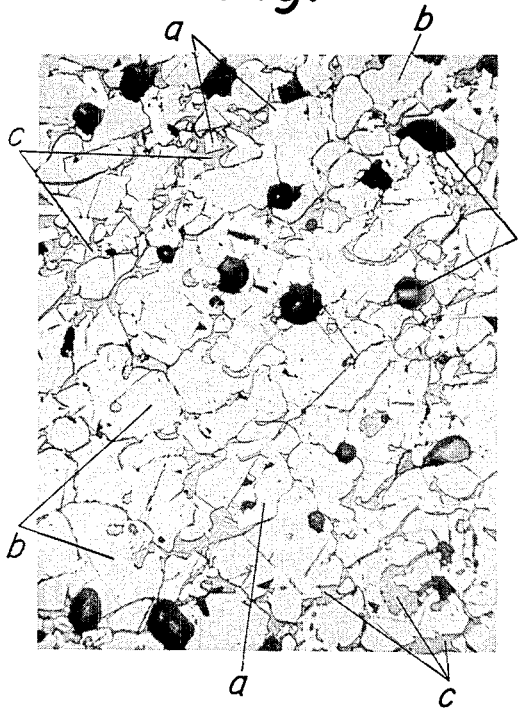
FIG. 2 is a photomicrograph of the microstructure at 180 magnifications of a basic refractory shape of the invention which was reheated at 3000° F. for 24 hours and water quenched.

The absence of the "halos" of silicate around the magnesia grains allows the magnesia grains to be bonded directly to each other or to the spinel phase which generally has the formula $RO \cdot R_2O_3$, where R may be Fe, Mg, Cr, or Al, which forms in the matrix of the shape by secondary recrystallization during the cooling from the firing temperature. The basic refractory shape may therefore be classified as a direct-bonded shape. Unexpectedly, the direct-bonded structure remains when the basic refractory shape is reheated and exposed to the high temperatures, for example 2800° F. and higher, prevalent in metallurgical furnaces. The retention of the direct-bonded structure may be seen in FIG. 2, which is a photomicrograph of a basic refractory shape of the invention which was formed from a mix including 60% by weight magnesia having a chemical composition of 95.0% magnesia, 1.0% silica, 0.90% alumina, 0.90% calcium oxide, 0.30% iron oxide and the remainder incidental impurities and 40% by weight of a Transvaal chrome ore having a chemical composition of 39.8% chrome oxide, 22.8% iron oxide, 14.4% alumina, 7.9% silica, 1.1% calcium oxide, 10.7% magnesia, the remainder being incidental impurities. The mix was subjected to wet fine grinding to produce a uniform grain size of a fineness such that all the grains passed a 200 mesh screen (Tyler Sieve) and 90% passed a 325 mesh screen (Tyler Sieve). After forming the mix into a shape by pressing, the said shape was fired at 3180° F. for 5 hours and cooled at 1300° F./hr. and was reheated to 3000° F. and held at this temperature for 24 hours and then quenched in water so as to retain the structure present at 3000° F. The photomicrograph of FIG. 2 shows a structure which includes white spinel grains $a$, formed upon secondary recrystallization of chrome ore constituents which had been in solution at the firing temperature, gray magnesia grains $b$, which are bonded directly to each other and a dark silicate phase $c$ in "islands" distributed in the matrix of the refractory shape. The black, generally circular portions $d$ are pores uniformly distributed through the structure of the shape. It will be noted that these pores are discontinuous. Thus it can be seen that slag elements or gases in the environment of the furnace do not have a continuous path to penetrate deeply into the refractory shape. It will be noted that the direct bonds formed in the refractory shape of the invention at the expense of the silicate bonds result in a higher strength at high temperatures than that achieved with the silicate bonded brick. It has been found that holding the refractory shape for about five hours at the firing temperature is sufficient to form the said "islands" although longer times may be beneficial.

The retention of the direct bond between magnesia grains of the refractory shape when reheated at high temperatures is not achieved in the usual commercial basic refractory shape having the same composition of the shape of the invention but having a coarse grain size, for example one in which 70% of the grains will be held on a 200 mesh screen (Tyler Sieve) and only 30% will pass the 200 mesh screen.

A comparison of FIG. 1 which is a photomicrograph of a basic refractory shape produced commercially by gap-sizing and reheated for 24 hours at 3000° F. and quenched in water, and FIG. 2, shows that the chrome ore, the large white grain in FIG. 1, has not been dissolved in the magnesia or liquid silicate phase at the firing temperatures. The silicate phase, dark gray areas, formed halos around the magnesia grains, light gray areas, preventing the formation of direct bonds between the magnesia grains, whereas the refractory shape of the invention which had been treated in a similar cycle shows islands of the silicate phase, dark gray area, and magnesia grains, light gray areas which are bonded directly to each other. The light areas, FIG. 2, are spinel which has recrystallied upon cooling. Note the small white areas, FIG. 2, within the magnesia grains indicating the chrome ore constituents had been in solution in the magnesia As mentioned previously, a portion of the chrome ore in solution will precipitate out even at cooling rates of up to 1300° F. per hour. The precipitated spinel phase is in the form of a "blocky" secondary recrystallization phase in the grain boundaries or in the magnesia grains themselves as shown at a in FIG. 3. Substantially all of the direct magnesia to magnesia bonding is retained.

Figure 3:
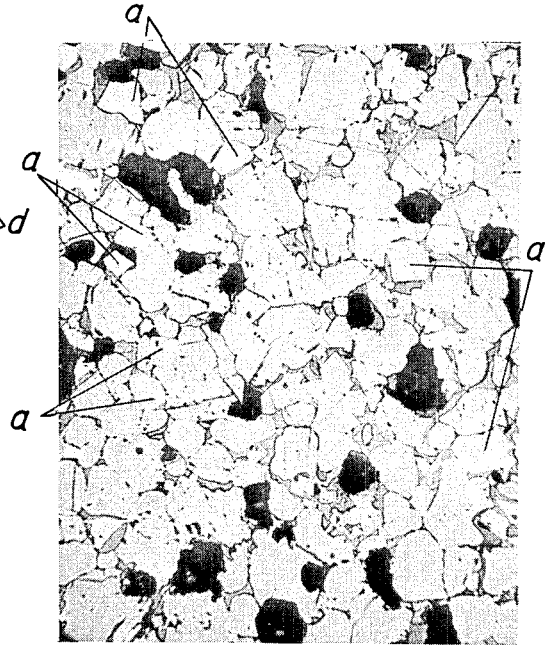
FIG. 3 is a photomicrograph of the microstructure at 180 magnifications of a basic refractory shape of the invention which has been fired at 3180° F. and cooled at the rate of 1300° F./hr.
Figure 4:
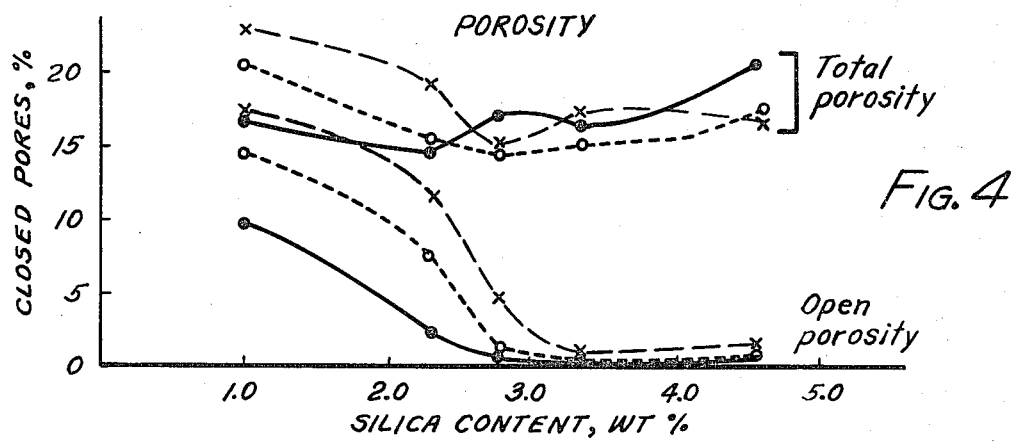
FIG. 4 is a graph showing the influence of silica content and firing temperatures on the percentage of open porosity and total porosity in the refractory shapes of this invention.
Figure 5:
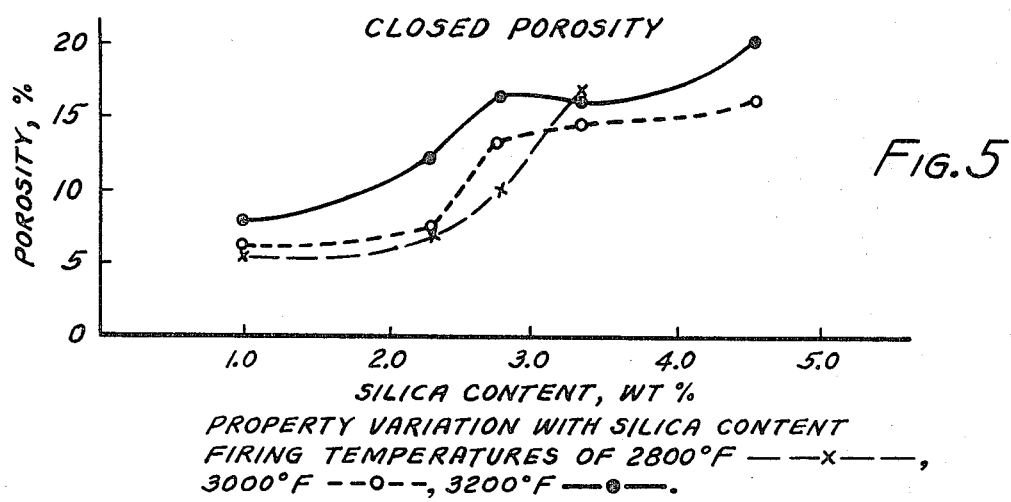
FIG. 5 is a graph showing the influence of silica content and firing temperatures on the closed porosity of the shapes of this invention which closed porosity is at least about 5% to about 20%.
Figure 6:
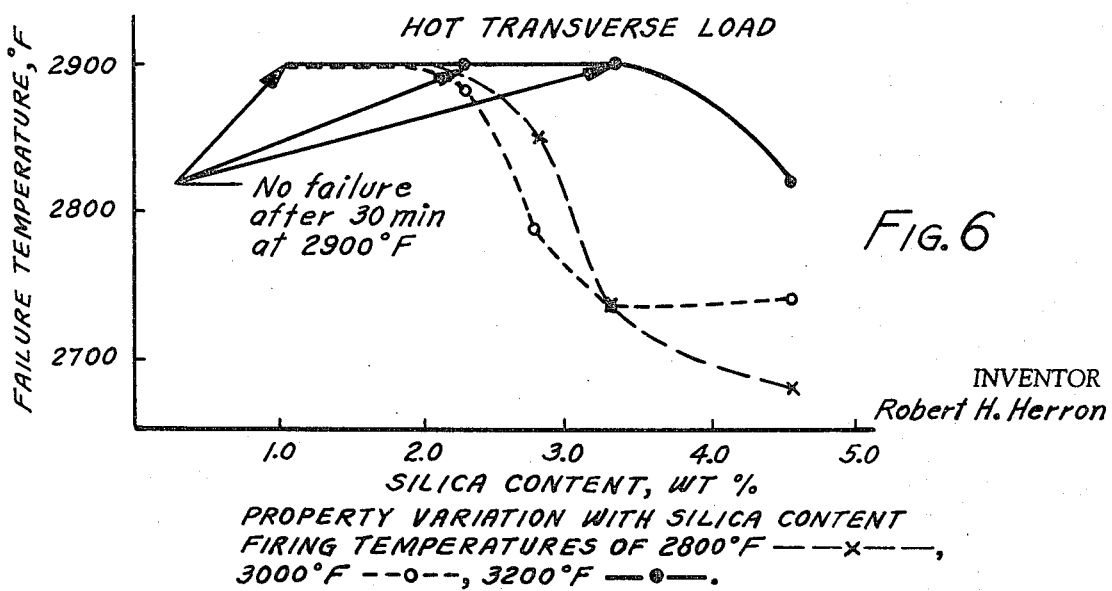
FIG. 6 is a graph showing the influence of silica content and firing temperatures on the hot transverse strength of basic refractory shapes of the invention.

Although the fired fine grain basic refractory shape appears to have a more dense structure than is normally attained, microscopic examination shows that a fine uniformly dispersed closed porosity is formed in the shape as shown in FIG. 3. It will be noted that the porosity is discontinuous, therefore the slag elements and gases present in the furnace have no direct path whereby they can penetrate the refractory shape. Thus the refractory shape has improved resistance to penetration by these slag elements and gases.

Although the apparent porosity of the fired refractory shape produced by the invention was between 1.5% and 10%, the actual porosity was found to be 20% as determined by microscopic measurement.

A comparison of a fired basic refractory shape of the invention and a direct-bonded shape made by prior art practices and a fused cast shape is shown below:

| Properties | Specimen | | |
|---|---|---|---|
| | A<br>Fine-grain ceramic-bonded shape of the invention | B<br>Prior art direct-bonded shape | C<br>Fused cast shape |
| Apparent specific gravity | 3.80 | 3.83 | |
| Bulk density (gm./cc.) | 3.43 | 3.16 | 3.10 |
| Apparent porosity (percent) | 10.2 | 16.0 | 6–14 |
| Slag penetration in inches at 2,910° F. in mill scale—2 hrs | 0.04 | 0.05–0.20 | 0.03–0.45 |
| Thermal shock cycles at 2,200° F.—air quench | 15–24 | 26–33 | 4–6 |
| Hot transverse load 75 p.s.i.—load, failure temperature | (¹) | (²) | (¹) |
| Room temperature modulus of rupture—p.s.i | 5,200 | 1,050 | 2,500 |

¹ No failure at 2,900° F. for 30 minutes.
² Failed at 2825° F.

It will be noted that specimen A had good resistance to slag penetration, good resistance to spalling, good high temperature strength and good room temperature strength while specimens B and C are deficient in one or more of these properties.

In a specific example of the invention a basic refractory mix of 60% by weight of a high purity magnesia analyzing 95.0% magnesia, 1.0% silica, 0.90% alumina, 0.90% calcium oxide, 0.30% iron oxide and the remainder incidental impurities, and 40% by weight of a Transvaal chrome ore having the following chemical composition:

| | Percent |
|---|---|
| $Cr_2O_3$ | 39.8 |
| $Fe_2O_3$ | 22.8 |
| $Al_2O_3$ | 14.4 |
| $SiO_2$ | 7.9 |
| CaO | 1.1 |
| MgO | 10.7 | and incidental impurities was prepared. The analysis of the mix was:

| | Percent |
|---|---|
| $Cr_2O_3$ | 19.0 |
| MgO | 61.0 |
| CaO | 1.0 |
| $Fe_2O_3$ | 8.7 |
| $Al_2O_3$ | 6.9 |
| $SiO_2$ | 4.1 |

The mix was subjected to grinding in a ball mill in the presence of an acetone grinding vehicle. A screen analysis of the mix showed that substantially all the grains in the mix passed a 200 mesh screen (Tyler Sieve) and 89.8% of the grains passed a 325 mesh screen (Tyler Sieve). A 2% binder consisting of 60% polyvinyl acetate in a methanol solution was added to the mix. The mix was then pressed into 1″ x 1″ x 6″ bars and 1⅜″ cubes in a press at 10,000 p.s.i. The samples were dried for 24 hours at room temperature and then at 150° F. to achieve a constant weight.

Several shapes were fired at 3180° F. for 5 hours. Some shapes, identified as (A), were cooled at the rate of 200° F. per hour and some identified as (B), at the rate of 1300° F. per hour to 1800° F. The properties of the fired shapes are shown in the following table:

| Sample identity | (A) | (B) |
|---|---|---|
| Firing temperature, ° F | 3,180 | 3,180 |
| Cooling rate, ° F./hr | 200 | 1,300–1,800 |
| Apparent specific gravity | 3.80 | 3.63 |
| Bulk density (gm./cc.) | 3.43 | 3.48 |
| Apparent porosity (percent) | 9.80 | 5.0 |
| Slag penetration in inches at 2,900° F. in mill scale—2 hrs | 0.04 | 0.04 |
| Thermal shock cycles at 2,200° F.—air quench | 20 | 22 |
| Hot transverse load 75 p.s.i.—load, failure temperature | (¹) | (¹) |

¹ No failure at 2,900° F. for 30 minutes.

Several basic refractory shapes were formed in the same manner as noted in the previous examples from a refractory mix having the following chemical composition by weight:

| | Percent |
|---|---|
| $Cr_2O_3$ | 17.6 |
| MgO | 60.6 |
| CaO | 1.46 |
| $Fe_2O_3$ | 9.8 |
| $Al_2O_3$ | 7.0 |
| $SiO_2$ | 2.77 |

The refractory shapes were fired at 2800° F. for five hours and were cooled at the rate of 1300° F. per hour to 1800° F. The shapes were found to have the following properties:

| Sample identity: | (C) |
|---|---|
| Firing temperature, °F. | 2800 |
| Apparent specific gravity | 3.71 |
| Bulk density (gm./cc.) | 3.53 |
| Apparent porosity (percent) | 4.80 |
| Hot transverse load 75 p.s.i.—Load, failure temperature, ° F. | 2861 |

It will be noted that the apparent porosity of the fast-cooled sample (B), was approximately one half that of the slow-cooled sample while the other properties were similar. It is apparent that a fast cooling cycle will result in a minimum of porosity in the fired refractory shape although either a fast cooling cycle or a slow cooling cycle may be used to produce a refractory shape within the scope of this invention. While sample (C) showed failure at 2861° F. under hot load, it must be remembered that commercial refractory shapes of this type must be fired above 3200° F. to achieve as good hot strength as shown by this shape.

While I have shown in a clear and concise manner the preferred embodiments of this invention, it will be understood that variations and modifications can be made without departing from the scope of the invention.

Wherever percentages are referred to in this specification, such percentages are by weight.

I claim:
1. A direct-bonded fired basic refractory shape of the magnesia chrome ore type consisting essentially of from about 50% to about 80% high purity magnesia by weight and from about 20% to about 50% chrome ore containing not less than 30% $Cr_2O_3$ by weight and from about 2% to about 5% silica by weight having a microstructure of magnesia, spinel, islands of silicates uniformly distributed in the shape, and closed pores uniformly distributed in the shape, said pores constituting a porosity of at least about 5% in the shape.

2. The direct-bonded fired basic refractory shape of claim 1 having a silica content of about 2½% to about 3%.

3. The direct-bonded fired basic refractory shape of claim 1 in which substantially all the chrome ore is in solution.

4. A method of manufacturing a fired basic refractory shape having a fine uniformly dispersed discontinuous porosity comprising:
 (a) mixing a basic refractory brickmaking mix consisting of 50% to 80% of high purity magnesia by weight and 20% to 50% chrome ore by weight, 2.00% to about 5% silica by weight,
 (b) grinding said mix to a fineness that substantially all the mix will pass a 150 mesh screen and a major portion will pass a 325 mesh screen,
 (c) pressing the mix into a refractory shape, and
 (d) firing said refractory shape at a temperature of at least 2800° F.

5. A method as claimed in claim 4 in which the firing temperature of step (d) is between 3000° F. and 3200° F. and silica is 2½ to 3%.

6. The direct-bonded fired basic refractory shape of claim 2 in which substantially all the chrome ore is in solution.

References Cited

UNITED STATES PATENTS 3,180,743   4/1965   Davies et al. _____ 106—59
3,180,744   4/1965   Davies et al. _____ 106—59

JAMES E. POER, Primary Examiner